United States Patent

[11] 3,568,162

[72] Inventor Wing N. Toy
Glen Ellyn, Ill.
[21] Appl. No. 763,198
[22] Filed Sept. 27, 1968
[45] Patented Mar. 2, 1971
[73] Assignee Bell Telephone Laboratories, Incorporated
Murray Hill, N.J.

[54] DATA PROCESSING WITH DUAL FUNCTION LOGIC
13 Claims, 12 Drawing Figs.

[52] U.S. Cl. .......... 340/172.5
[51] Int. Cl. .......... G06f 5/00
[50] Field of Search .......... 235/157; 340/172.5

[56] References Cited

UNITED STATES PATENTS

| | | | |
|---|---|---|---|
| 3,019,976 | 2/1962 | Taylor | 340/172.5 |
| 3,219,979 | 11/1965 | Bespalko et al. | 340/172.5 |
| 3,302,185 | 1/1967 | Cox, Jr. et al. | 340/172.5 |
| 3,310,785 | 3/1967 | Couleur et al. | 340/172.5 |
| 3,341,817 | 9/1967 | Smeltzer | 340/172.5 |
| 3,374,467 | 3/1968 | Cast et al. | 340/172.5 |

*Primary Examiner*—Gareth D. Shaw
*Attorneys*—R. J. Guenther and Kenneth B. Hamlin

ABSTRACT: The contents of a selected one of plural general purpose registers in a data processing system are selectably coupled through first-ZERO-detecting logic to modify the contents of a buffer register. The modification takes the form of setting to the ONE state the bit position in the buffer register corresponding to the low order ZERO position of the originating register contents and resetting any lower bit positions to ZERO. The modified contents of the buffer register are then coupled back to the one originating register. Program-controlled circuits perform, in selectable sequences, the normal store and reset types of operations on the originating registers in the course of the movement of information to the ZERO detecting logic and back again. Illustrative processing functions that can be selected in this fashion include marking a low order ZERO and incrementing the contents of the originating register. Another first-ZERO-detecting logic circuit is employed to control the operation of a rotate circuit in cooperation with the first-mentioned ZERO detecting logic to permit both ZERO detectors to have a data bit width which is much smaller than the processor word size.

INVENTOR
W. N. TOY
BY
Charles Scott Phelan
ATTORNEY

DATA PROCESSING WITH DUAL FUNCTION LOGIC

BACKGROUND OF THE INVENTION

1. Field of the Invention

This invention relates to data processing systems and more particularly to such systems that combine in one set of circuits plural operations which all depend upon a common logic function.

2. Description of the Prior Art

It is well known in the data processing art to design a processing system to utilize efficiently any given circuit therein for as many functions as possible. It is also known to arrange electronic circuits for circuit integration to have as small a number of external connections as practical. Thus, it is desirable to have as many of the required transistor gates as possible controlled entirely by means of signals applied through circuits which are a part of the same integrated circuit chip so that the number of external connections which must be made to the chip may be held to a minimum. This concept tends to reduce manufacturing costs and increase circuit connection reliability. One way to extend the concept in a system is to replace plural, functional chips by a single multifunctional chip. The more functions assigned to any given circuit the greater are the number of external control leads that would seem to be required. However, the total number of external connections in the processing system may be reduced because of more efficient usage of logic gates.

It is, therefore, one object of the present invention to improve the efficiency of data processing systems in a way which is reasonably compatible with integrated circuit techniques.

It is another object to arrange a data processing system for performing multiple processing operations by means of a common logic step so that the logic for such common step may be more readily utilized for multiple functions with a minimum of external control circuits.

SUMMARY OF THE INVENTION

The aforementioned and other objects of the invention are realized in an illustrative embodiment thereof in which a plurality of data processing functions are arranged to be performed in a way which involves a common logic determination for all such functions. Thus, the presence of a low order data bit of a predetermined bit type is detected. Instruction-controlled signals cause the circuits for making the detection to be interconnected with the remainder of the processor at appropriate times to realize the desired functions.

It is one feature of the invention that an illustrative common logic determination is a first-ZERO-detection function in which information input signals are utilized to provide an output indication of the bit position of the low order ZERO in the input information.

It is another feature that the first ZERO detection output information is useful for both counting operations and marking a low ZERO to a ONE state.

A further feature is that the first ZERO detector circuits are utilized in conjunction with rotate circuits so that the two can cooperate to permit the use of a first ZERO detector of much smaller bit width than the width of the usual processor word.

Still another feature is that the cooperation between the rotate circuit and the first ZERO detector circuit is such that the combination is readily controlled for counting by selectable increments of different sizes.

BRIEF DESCRIPTION OF THE DRAWING

A more complete understanding of the invention may be derived from a consideration of the following detailed description in connection with the appended claims and the attached drawing in which:

DETAILED DESCRIPTION

Figures 1, 2:
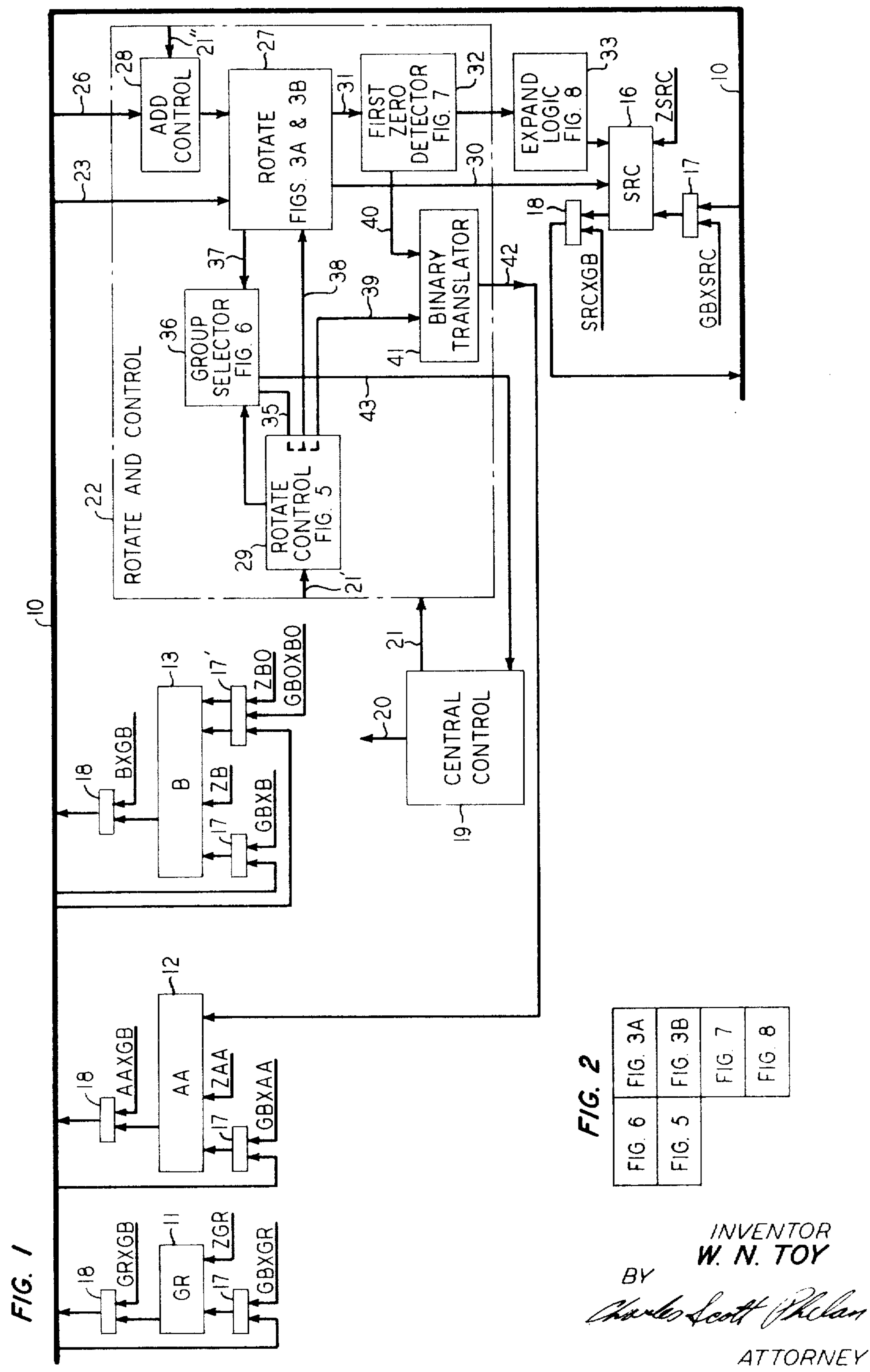
FIG. 1 is a simplified block and line diagram of a data processing system utilizing the invention.
FIG. 2 is a diagram showing the arrangement of other figures of the drawing to form a composite detailed diagram of a part of FIG. 9.

FIG. 1 depicts in simplified block and line diagram form a data processing system of a type which is now known in the art and in which the present invention is advantageously employed. A gating bus 10 is provided for interconnecting a plurality of general purpose registers 11, 12, 13, and 16 in bit-parallel fashion through appropriate register input gates 17 and output gates 18. Each register includes a plurality of bistable circuits arranged for conveniently representing information in a binary coded form so that each bistable circuit represents one information bit. The bit width *m* of each of the registers corresponds to the advantageously predetermined bit width of a typical data processing word for use in the system of FIG. 1. In the illustrative embodiment *m* is advantageously 16. The registers 11, 12, 13 and 16 are advantageously further designated by the lettered reference characters GR, AA, B, and SRC, respectively. Although only a single block is shown for each of the input and output gates 17 and 18, it is to be understood that a separate gate of each type is provided for each bit position at each register; and all such gates of any one type at a particular register are simultaneously similarly controlled.

A central control 19 provides timed sequencing signals in accordance with decoded instructions drawn from a program store, not shown, contained therein in a manner which is well known in the art. A circuit 20 supplies such signals to the respective register gates which bear input connections with only mnemonic reference characters for indicating a certain type of operation which is performed on a register, or for indicating the routing of information signals which is established by the corresponding gate. A circuit 21 similarly provides timed sequencing signals from the central control 19 to a rotate and control circuit 22 which will be hereinafter discussed.

It will be understood by those skilled in the art that data storage arrangements are included in central control 19. Furthermore, numerous logic, arithmetic, and control circuits advantageously included in the processor system are not shown because they are known in the art and are not needed for an understanding of the present invention.

Gating bus 10 is actually a cable of circuits with one circuit provided for each bit position of a processor word. Since the inputs of all input gates 17 and the outputs of all output gates 18 are connected to the bus 10, it is possible through the use of sequence signals from central control 19 to move data from any one of the aforementioned registers to another one in a single time interval. In the illustrative embodiment, single-rail logic connections are provided wherein input gates 17 are coupled to setting input connections of register bistable circuits. Each register is usually selectively ZEROed, before new information is written therein, by means of a signal supplied from central control 19. However, in some applications it may be more convenient to interconnect registers and the gating bus by double-rail logic connections so that any register which is to receive new data is positively overwritten with such data without the necessity for previously ZEROing the register.

By way of illustrative example of a register-to-register transfer, assume that data is to be transferred from the GR register 11 to the B register 13 in a given time interval. Central control 19 first applies the ZB signal to register B for ZEROing that register, and thereafter the central control signals GRXGB and GBXB are simultaneously applied to the appropriate output gates 18 and input gates 17, respectively, for coupling the contents of the GR register to the gating bus 10 and from the gating bus 10 to the B register 13.

The rotate and control circuit 22 is coupled between gating bus 10 and the SRC register 16 and is advantageously formed on a single integrated circuit chip. Information input signals are applied to the rotate and control circuit 22 by way of circuits 23 and 26. The total of the individual circuit paths in circuits 23 and 26 corresponds to the total bit width of a processor word. The circuits 26 represent only selected bit positions of the processor word and are applied to a rotate circuit 27 through an ADD control circuit 28, for a reason which will be subsequently described. The corresponding circuits of the remaining bit positions are coupled directly to the rotate circuit 27 from bus 10.

As previously mentioned, timed sequencing signals are applied to the rotate and control circuit 22 by way of the circuit 21. Within rotate and control circuit 22 such control signals are applied by way of circuits 21′ to a rotate control circuit 29 and by way of circuits 21″ to the ADD control circuit 28. Output signals for all bit positions of the rotate circuit 27 are coupled through individual circuits schematically represented by the lead 30 to setting inputs of the SRC register 16. Output signals from predetermined ones of the bit positions of the rotate circuit 27 are also coupled through a cable 31, a first-ZERO-detector 32, and expand logic 33 to the SRC register 16.

Inputs to the rotate circuit 27 are advantageously grouped, as will be subsequently shown into *n* groups for controlling a group selector 36 of the first-ZERO-detecting type by way of a cable 37. Four equal sized groups of four bits each are advantageously employed. The group selector 36 indicates which of the input bit groups contains the lowest order ZERO and applies corresponding control signals by way of a cable 35, rotate control 29, and a circuit 38 to the rotate circuit 27 for controlling the operation thereof to move that selected bit group into the output bit positions of the rotate circuit 27 which are coupled to the first-ZERO-detector 32. Selected outputs from the group selector 36 are applied by way of a rotate control 29 and a circuit 39, and from the first-ZERO-detector 32 by way of a circuit 40, to operate a binary translator 41 which produces on a circuit 42 binary coded output signals designating the bit position containing the low order ZERO. The circuit 42 couples the translator 41 outputs to AA register 12. A circuit 43 supplies outputs directly from group selector 36 to central control 19 for further data processing utilization in accordance with whatever instructions may be then controlling operation of the system.

The circuits of rotate and control circuit 22 operate on a combinational logic basis in that any output signal conditions are stable only so long as corresponding information and control input signals also remain stable. If any information or control input signal is altered, a corresponding change ripples through the rotate and control circuit 22 to produce a corresponding output signal modification with no intervening time gating operation. Control signals applied directly to rotate circuit 27 from the rotate control circuit 29 determine the amount of instruction controlled rotation to be applied to stable signal conditions on gating bus 10, and that rotated information is coupled to the SRC register 16. Similarly, the rotated information in the preselected outputs of the rotate circuit 27 are coupled through the first-ZERO-detector 32 to the expand logic 33. However, that circuit does not affect the SRC REGISTER 16 in the absence of a proper timed sequence signal FLZA.

If the SRC register had been previously ZEROed by the ZSRC signal, the rotated information from the circuit 30 would be stored in the register 16. However, since it is possible to move the contents of any one of the GR, AA, or B registers to the SRC directly while the same information is being simultaneously coupled through the rotate and control circuit 22, different operations can be performed on the data by exercising program control over the sequence in which storage or reset operations are performed on the various general purpose registers. Some illustrative operations which are conveniently performed are achieving different selected degrees of rotation, counting by different selectable increments, selecting and marking a low order ZERO, or complementing the low order bit in any selected register. These various operations can be achieved because of the advantageous employment of first-ZERO-detecting logic in the rotate and control circuit 22 since each of those operations involves at some stage the logic step of detecting the low order ZERO position in a processor word. Details demonstrating the way in which these various operations may be realized will be evident from the subsequent consideration of details of the various circuit blocks of the rotate and control circuit 22.

FIG. 2 contains a diagram indicating the manner in which FIGS. 3A, 3B, 5, 6, 7, and 8 can be arranged to form a composite schematic diagram illustrating the relevant details of the rotate and control circuit 22 of FIG. 1.

Figure 3A:
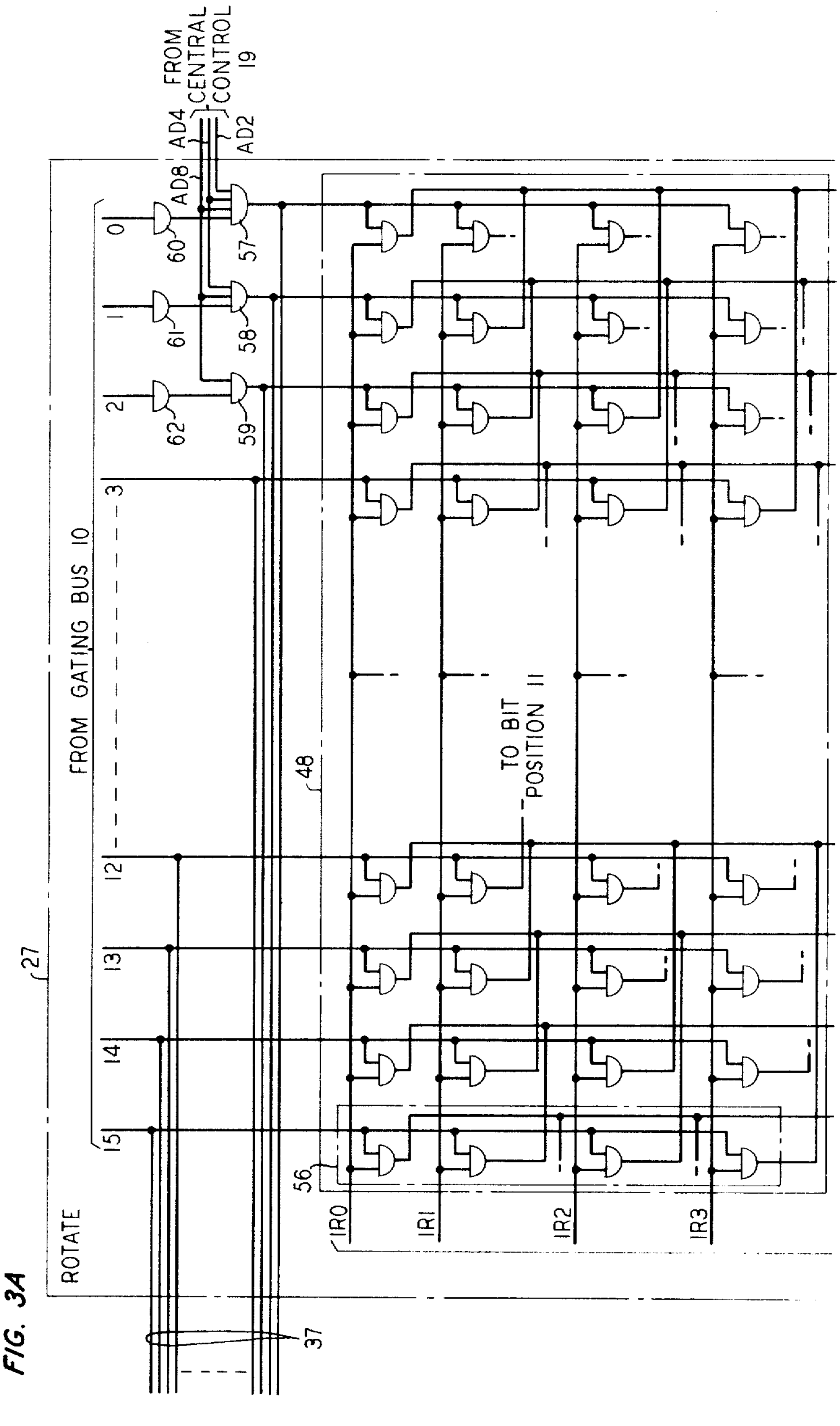
FIGS. 3A and 3B comprise a schematic diagram of rotate gates utilized in FIG. 1.
Figure 3B:
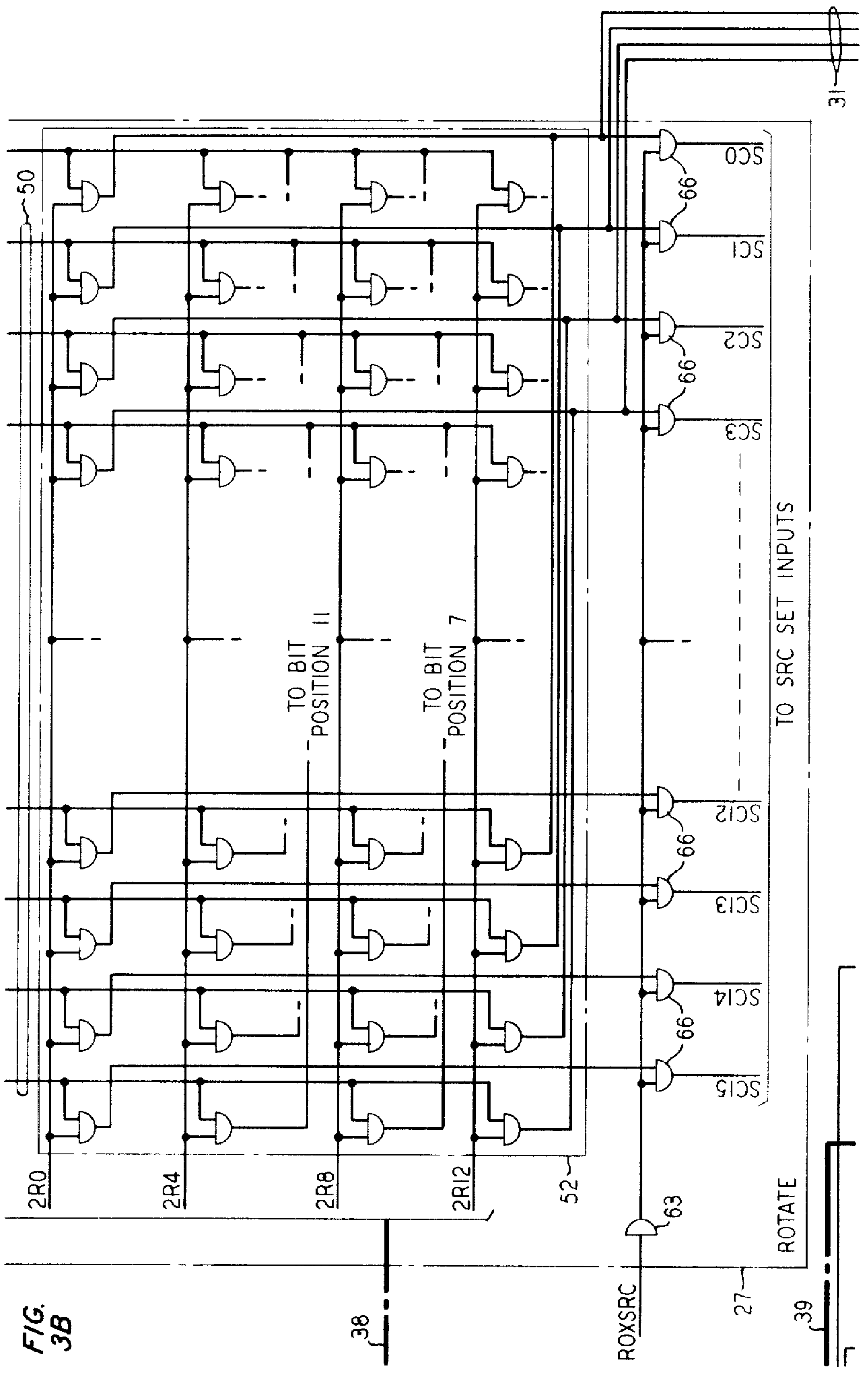
Figure 4:
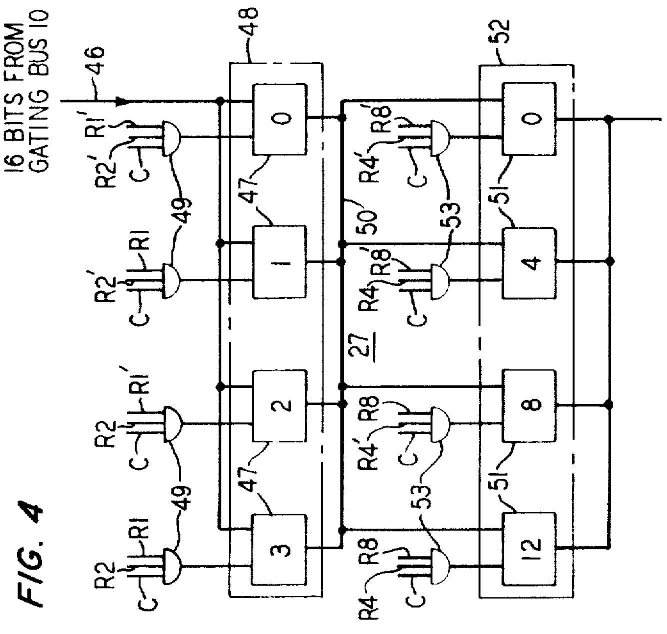
FIG. 4 is a simplified block and line diagram illustrating the concept of the rotate circuit in FIG. 1.

Rotate circuit 27 is shown in FIGS. 3A and 3B in detail; but, to facilitate an understanding thereof, its operation will first be outlined briefly in connection with the block and line diagram of FIG. 4. In the latter figure it can be seen that circuits from the 16 bit positions in gating bus 10 are included in a cable 46 which is applied in multiple to inputs of four different shift gating circuits 47 in a first stage 48 of the rotate circuit 27. These shift gating circuits are adapted for shifting information in the 16 bit positions by 0, 1, 2, or 3 bit positions, respectively. The selection of the amount of rotation to be achieved in the first stage 48 is accomplished by means of control gates 49 in response to signals from central control 19 in FIG. 1. Thus, each such gate receives on a circuit C a control signal which partially enables the gates 49 when a use of the rotate circuit 27 is required. Each gate also receives on leads designated R1, R2, R1′, and R2′ binary coded information to indicate which of the four shift gating circuits 47 is to be activated.

Thus, for example, the application of a positive control signal on the circuit C enables all of the gates 49, and a positive signal on each of the circuits R1 and R2 causes the shift gating circuit 47 which produces the 3-bit rotation to be activated. At the same time at least one ground, the complement of either R1 or R2, is applied to each of the other control gates 49 to cause their corresponding shift gating circuits 47 to be disabled.

Output connections of all of the shift gating circuits 47 are brought together in a common bus 50 from which they branch out again to four additional shift gating circuits 51, in a second stage 52 of the rotate circuit 27. These shift gating circuits 51 are selectively operated by control gates 53 to produce rotation through 0, 4, 8, or 12 bit positions, respectively, in much the same fashion previously described in connection with stage 48. In this case each of the control gates 53 receives the same control enabling signal on circuit C as was applied to the gates of the stage 48. In addition, gates 53 receive from central control 19 different permutations of additional binary coded signals R4, R8, R4′, and R8′ for determining which of the shift gating circuits 51 should be enabled. Thus, it will be seen that by providing appropriate permutations of four bits of binary coded rotate information, any amount of rotation from 0 through 15 bit positions can be selected in the rotate circuit 27. For example, to achieve a rotation of 11-bit positions a rotation of 3 bits would be selected by the signals R1 and R2 in the first stage 48; and a further rotation of 8 bits would be selected by the signals R4′ and R8 in the second stage 52.

The control gates 49 and 53 in FIG. 4 are advantageously conventional NAND gates which utilize input connections of a coincidence type to control conduction of a transistor amplifier. This circuit combination responds, for example, to a coincidence of positive input signals to produce a ground output signals, and it responds to the presence of a ground on any one input circuit to produce a positive output signal. Such circuits are well known in the art and are utilized throughout the drawings with various numbers of input connections. In some cases only a single input connection is employed and in that case the NAND gate operates as an inverter.

The two stages 48 and 52 of the rotate circuit 27 are shown in more detail in FIGS. 3A and 3B, respectively. In FIGS. 3A and 3B the respective shift gating circuits for achieving different amounts of rotation are represented by successive rows of NAND gates which are connected to realize the different amounts of rotation in the manner just described in connection with FIG. 4. The respective rows, except the first row in stage 52, of shifting gates in stages 48 and 52 are arranged in increasing order of the amount of rotation produced from the upper portion of FIG. 3A to the lower portion of FIG. 3B.

In FIGS. 3A and 3B the various gates are conveniently considered in modules of four gates such as the module 56 indicated in FIG. 3A. Each of the four gates in the module receives an input from the same bit circuit from the gating bus 10, and each of the those four gates also receives a different control lead from the rotate control circuit 29 so that only one out of the four gates of a module is enabled. The outputs of the respective four gates of the module 56 are also differently connected to achieve the indicated amount of rotation. Thus, in FIG. 3A the upper gate in each module has its output retained in the same bit position as its input. The remaining three gates of the module have their respective outputs cross-connected to bit circuits which are removed by 1, 2, and 3 bit positions, respectively, The same type of gate module is employed throughout the first stage 48. A similar module is employed in the second stage 52, and it differs only in that the outputs of the remaining three gates of the module are cross-connected to bit circuits which are removed by 4, 8, and 12 bit positions, respectively.

The top row of gates in stage 48 receives in common an input control signal 1RO to indicate that selection of this row of gates in the first stage 48 produces zero rotation of the information received on the 16 bit circuits which couple gating bus 10 to the rotate circuit 27. The same 16 bit circuits are also applied in multiple to input connections of gates in the second row which are enabled by a control signal 1R1, in the third row which are enabled by a control signal 1R2, and in the fourth row which are enabled by a control signal 1R3.

The control signals 1R0 through 1R3 are provided on a 1-out-of-4 basis in response to the operation of gates, to be described in rotate control circuit 29, which receive the binary coded input information of the type previously discussed in connection with FIG. 4. Control signals 2R0 through 2R12 similarly control stage 52.

Only a few of the bit position interconnections are shown in the drawing since they are all similar to the ones illustrated, for example, for bit position 15. Such corresponding connections include, although not shown, connections of the end-around-carry type for the low order bit positions to carry bit information around to corresponding high order positions so that no rotation produces a loss of information. For example, the output of the gate in bit position 0 of the second row is carried around, by circuits not shown, to the bit position 15 lead to accomplish the correct 1-bit rotation without loss of information. Other end-around-carry connections not shown are also provided to produce proper rotation without loss of information for all of the properly selectable magnitudes of rotation.

In the upper right-hand portion of FIG. 3A six additional gates are provided in ADD control circuit 28. Two of those gates are in each of the circuits for bit positions 0, 1, and 2. Three of the gates 57, 58, and 59 receive input signals from central control 19 when the processor is operating in a counting operation for selecting a mode of counting which involves increments of different sizes as will be subsequently described in greater detail. The remaining three gates 60, 61, and 62 are simply inverters placed in the circuits for bit positions 0, 1, and 2 so that signals in those positions will be applied to inputs of the first stage 48 of shift gating circuits in the proper sense with respect to signals in all other bit positions.

Although the rotate circuit 27 has thus far been described in connection with right-hand rotation, and gate interconnections for only that type of operation are shown, equivalent left rotations are also possible as will be evident from the subsequent discussion of rotate control circuit 29. For example, a left rotation of 2 bit positions is equivalent to a right rotation of 14 bit positions in a 16-bit word. Thus, such an equivalent left rotation is produced by a right rotation of 2 bits in the first stage 48 and a further right rotation of 12 bits in the second stage 52. No additional time delay must be provided for in either circumstance since all rotations of 0 to 15 bit positions require the same delay of two NAND gates through the two rotate stages 48 and 52.

Figure 7:
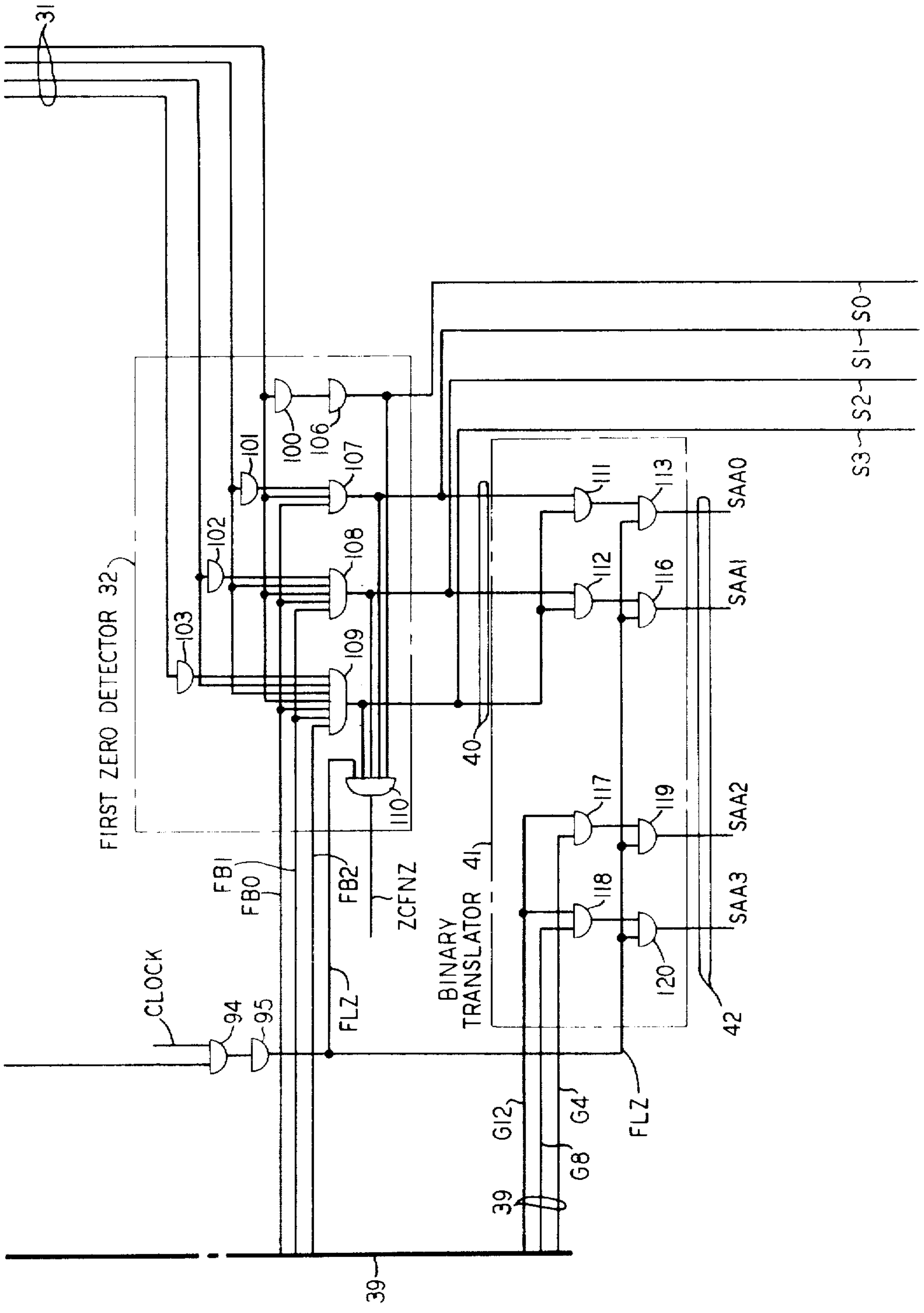
FIG. 7 is a schematic diagram of a first-ZERO detector and a translator utilized in the system of FIG. 1.
Figure 8:
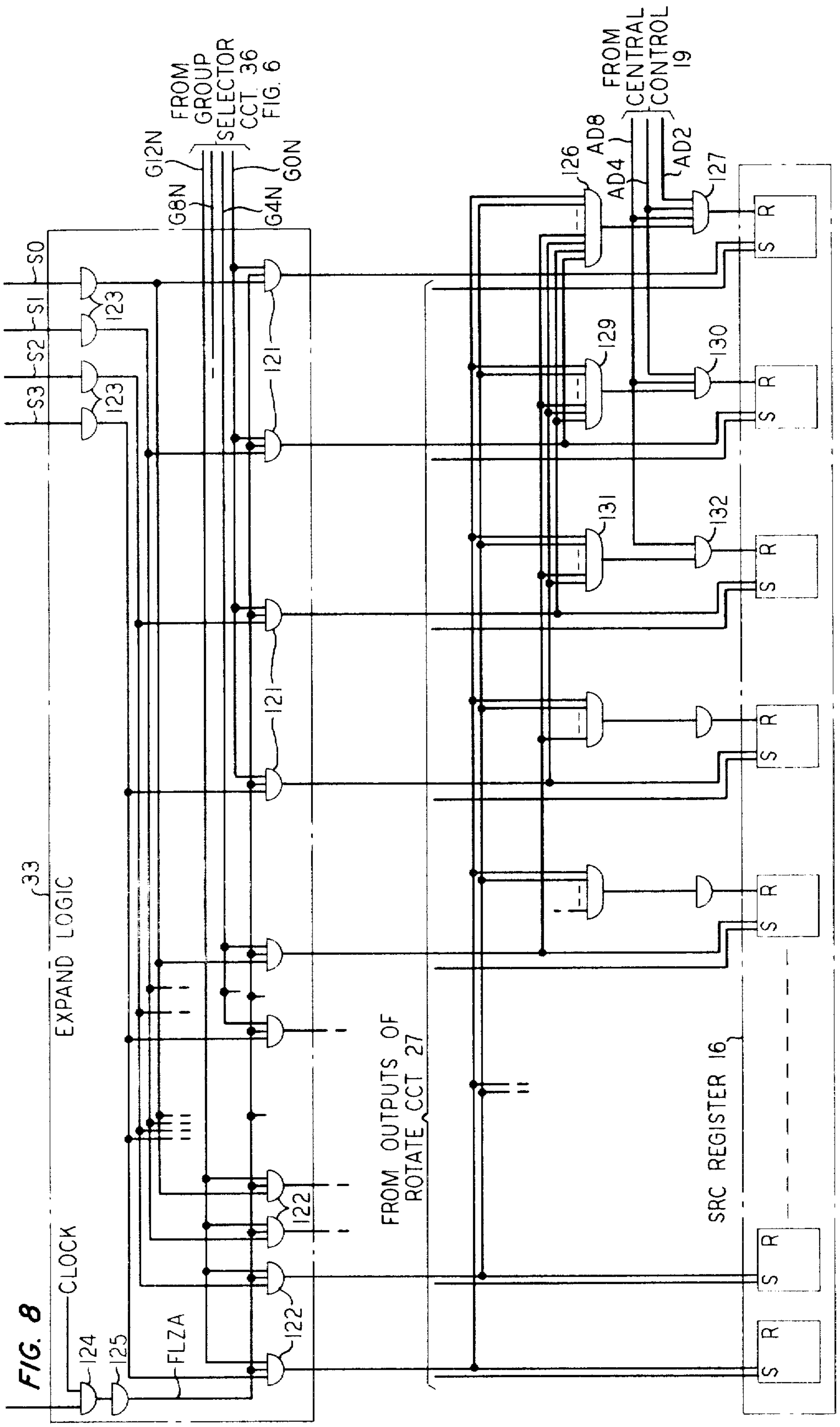
FIG. 8 is a schematic diagram of the expanding logic gates and a register in the system of FIG. 1.

When a rotation is to be utilized in the system of FIG. 1, a control signal ROXSRC is applied through an inverting gate 63 in the lower left portion of FIG. 3B to enable output coupling gates 66 for coupling the 16 bit position output circuits of the rotate circuit 27 to the setting inputs of the respective register stages in SRC register 16, which is shown at the bottom of FIG. 8. However, the outputs of the 4 low order bit positions in the second stage 52 in FIG. 3B are also coupled by circuits in the cable 31 to input connections of the first-ZERO-detector 32 in FIG. 7. Details of the circuits in FIGS. 7 and 8 will be subsequently described.

Figure 5:
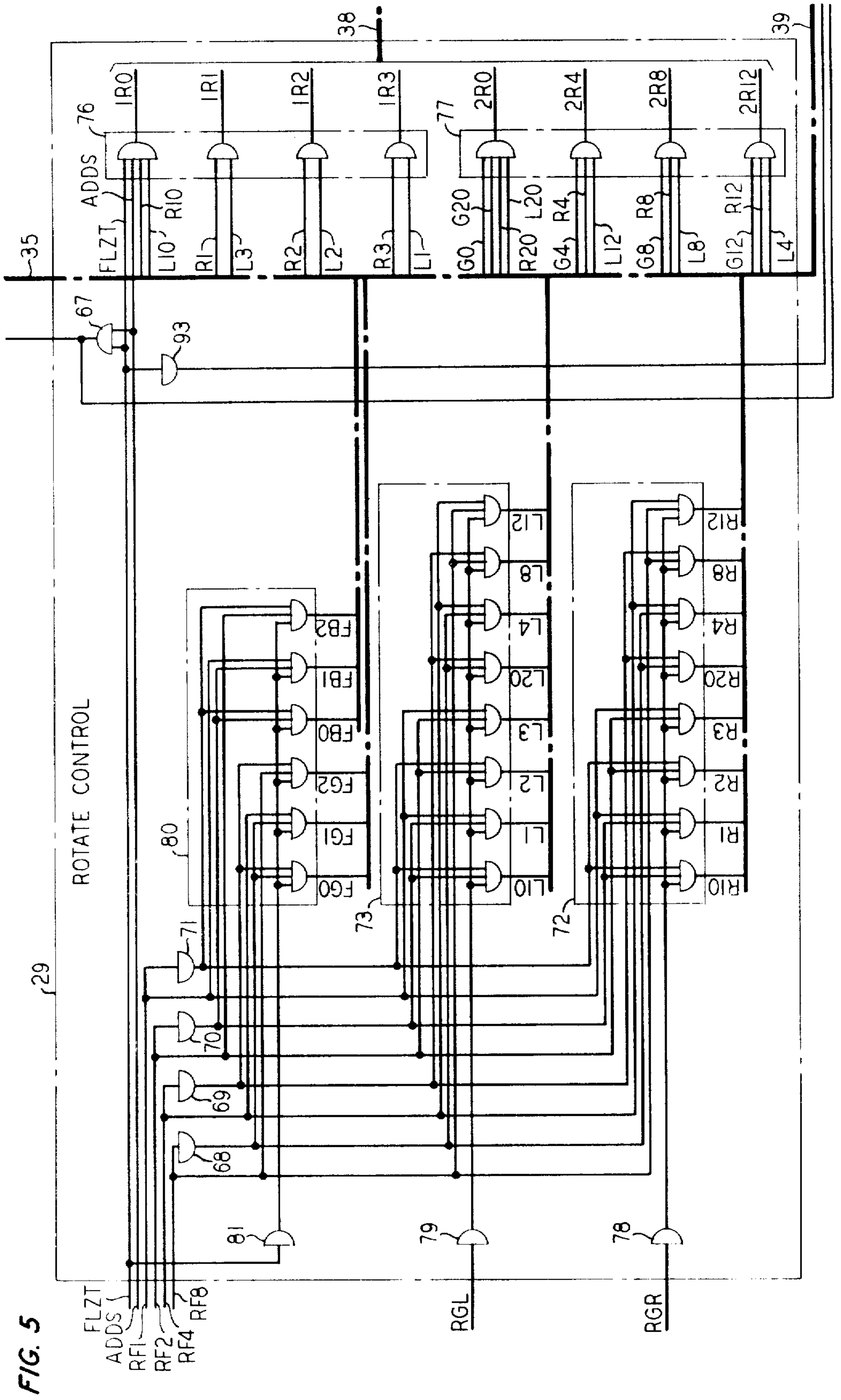
FIG. 5 is a schematic diagram of rotate control gates in FIG. 1.

The rotate control circuit 29 of FIG. 5 is provided to receive instruction-directed control signals from central control 19 and to convert those signals into a form which is convenient for utilization in controlling other circuits within the rotate and control circuit 22. Eight input circuits, part of cable 21, are shown at the left in FIG. 5, and these 8 are utilized for producing operations which are relevant to aspects of the invention illustrated herein. Other functions can also be readily performed by the processing system of FIG. 1 and other control circuits supplied to the rotate control 29, as will be understood by those skilled in the art. However, their illustration is not necessary to an understanding of the present invention.

Two of the input circuits in FIG. 5 provide FLZT and ADDS control signals at appropriate times to different inputs of a gate 67. The signal state at inputs to that gate is normally positive. Whenever the FLZT operation or an ADDS operation is to be performed, the appropriate control signals goes to ground, thereby causing the gate 67 to produce a positive output signal which is applied to the group selector circuit 36 in FIG. 6 and to circuits of FIG. 8 for purposes which will be hereinafter described. Similarly the FLZT signal is coupled through an inverting gate 93 to circuits of FIG. 7.

Four additional input signals RF1, RF2, RF4, and RF8 are applied on additional separate circuits of cable 21. These signals define the amounts, in binary coded form, of rotation which is to be produced by rotate circuit 27, and they correspond to the similarly designated input signals hereinbefore discussed in connection with FIG. 4. However, the form of the four signals which are applied to rotate control circuit 29 is single-rail logic, and for convenience of operation four inverting gates 68, 69, 70, 71 are provided in FIG. 5 to convert these binary coded signals to double-rail logic form. The resulting eight circuits are applied to two sets 72 and 73 of decoding gates. The decoding gates 72 produce 8 output signals which are utilized in different combinations by two sets 76 and 77 of control gates for providing the necessary 1-out-of-4 coded control signals to the respective stages 48 and 52 of rotate circuit 27. If a right rotation is to be performed on the contents of the GR register 11, the central control provides an RGR signal to an inverting gate 78 in FIG. 5 for enabling the decoding gates 72. On the other hand, if a left rotation is to be performed, an RGL signal is supplied through a gate 79 to enable the decoding gates 73.

As an example of the operation of rotate control 29, assume that a 1-bit right-hand rotation is to be performed. A ground RGR signal is inverted by the gate 78 to provide a positive enabling signal to the decoding gates 72. Similarly, a positive RGL signal is inverted by gate 79 to disable the decoding gates 73. Thus, a right-hand rotation is defined in the amount specified by the binary coded RF signals. For a one bit rotation RF1 is positive, while RF2, RF4, and RF8 are ground. The positive RF1 signal further enables decoding gates 72 which produce control signals R1 and R3. At the same time gate 70 output inverts the ground RF2 signal to provide a further enabling signal to the decoding gate 72 which produces the R1 output signal. The latter gate is thus fully enabled and provides a ground output R1 control signal.

The ground RF2 signal disables the decoding gates 72 which produce the R2 and R3 outputs. Gate 71 inverts the positive RF1 signal to provide a ground disabling signal to the decoding gate 72 which produces the R10 control signal. Similarly, the ground RF4 and RF8 control signals disable the decoding gates which produce control signals R4, R8, and R12. However, inverting gates 68 and 69 invert the RF4 and RF8 control signals to provide positive enabling signals to the decoding gate 72 which provides control signal R20 thereby causing the latter control signal to be in the ground state. Thus, considering the outputs of decoding gates 72 together they provide two sets of 1-out-of-4 coded control signals which are applied respectively to the control gates 76 and 77. In the first set the ground R1 signal and the positive R10, R2, and R3 signals are applied to corresponding gates of the control gates 76. Similarly, the ground R20 signal and the positive signals R4, R8, and R12 in the second set are applied to the control gates 77. The two aforementioned ground control signals disable one gate in each of the sets of control gates 76 and 77 for producing positive enabling signals 1R1 and 2R0 for enabling gates in the second row of first stage 48 and the first row of second stage 52. The other positive output control signals from decoding gates 72, together with all of the positive outputs of decoding gates 73, and the positive control signals FLZT and ADDS, fully enable the remaining control gates 76 and 77 for inhibiting gates in other rows of rotate circuit 27.

Figure 6:
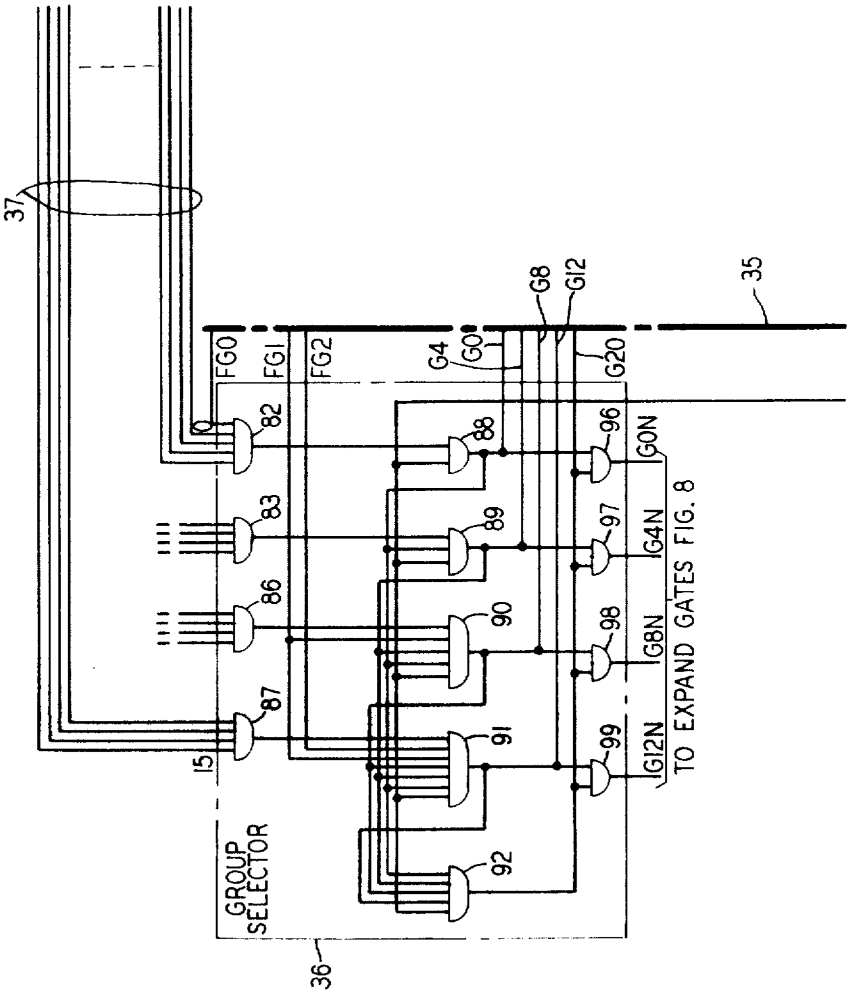
FIG. 6 is a schematic diagram of a group selector circuit of FIG. 1.

The aforementioned ground output from gate 67 in rotate control circuit 29 disables certain of the gates in the group selector circuit 36 in FIG. 6 so that outputs of that circuit which are also coupled to the control gates 77 are positive. Since only the 1R1 and the 2R0 control signals applied to rotate circuit 27 are positive, a one bit rotation is produced in first stage 48 and the information signals pass through the second stage 52 without rotation. Consequently, the output of rotate circuit 27 corresponds to the information input except that it has been rotated by one bit position to the right. This condition corresponds to that which was directed by the previously described input control signals to the rotate control circuit 29 in FIG. 5.

Different permutations of the RF- control signals would produce other right-hand rotations as will be apparent to those skilled in the art. Likewise such rotations may be either to the left or to the circuit. As previously noted, since the decoding gates 73 function the same as the gates 72. The outputs of gates 73 are wired to appropriate ones of gates 76 and 77 as indicated to produce the equivalent left rotations.

Figure 9:
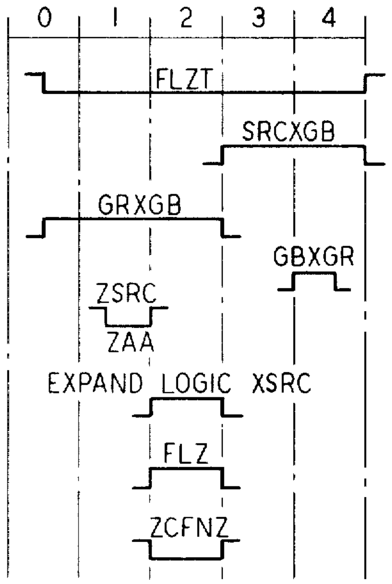
FIGS. 9 10, and 11 are timing diagrams illustrating typical operations for the system of FIG. 1.

In FIG. 5 the double rail format of control signals RF1 through RF8 is further applied to a set of masking gates 80 which are utilized during a find-low-ZERO-test operation to cause the processor to examine only a predetermined part of the bit positions in the information signals received by rotate circuit 27 from gating bus 10. During such a test operation the FLZT signal goes to ground, as indicated in FIG. 9, and is inverted by a gate 81 to enable the masking gates 80. Three of the masking gates 80 produce control signals FGO, FG1, and FG2 which are applied to group selector circuit 36 for controlling that circuit to examine only the desired portion of the information bits coupled from gating bus 10. Thus, a ground on only FG0, FG1, or FG2 causes the group selector circuit 36 to disregard the information contained in groups 1, 2 and 3, groups 2 and 3, or group 3, respectively, in the processor word. Similarly, three further masking gates 80 produce control signals FB0, FB1, and FB2 for exercising a corresponding control on the four bit positions of first ZERO detector 32 so that such detector will disregard one or more of its bit positions in making the first ZERO detection determination. A more complete discussion of the operation of group selector circuit 36 and first ZERO detector 32 will subsequently be presented.

In FIG. 6 the group selector circuit 36 receives from gating bus 10 via rotate circuit 27 the 16 circuits in cable 37 which carry the information signals for the 16 bit positions of a processor word. These 16 circuits are advantageously divided into successive groups of four circuits each in the sequence of increasing orders of binary significance from bit position 0 through bit position 15. The circuits for group 0 bits 0 through 3 are applied to inputs of a gate 82, group 1 bits 4 through 7 are applied to a gate 83, group 2 bits 8 through 11 are applied to a gate 86, and group 3 bits 12 through 15 are applied to a gate 87.

Each of the gates 82, 83, 86, and 87 has a single individual output connection which is applied to an input of a different one of four further gates 88, 89, 90, and 91. The latter four gates are enabled for operation by a positive output from the gate 67 in FIG. 5 in response to a ground state for either the FLZT control signal or the ADDS control signal. If one or the other of the latter two control signals is present, the RGR and RGL control signals are absent so that decoding gates 72 and 73 all provide positive outputs to control gates 76 and 77. Accordingly, only the control gate 76 which produces the 2R0 signal in response to a ground FLZT signal or a ground ADDS signal is disabled and provides a positive enabling signal to the top row of gates in rotate circuit 27. Accordingly, the first stage 48 of rotate gates is forced to the condition in which it produces ZERO rotation. The gates of the second stage 52 are controlled by outputs from control gates 77 in response to one of the five outputs G0, G4, G8, G12, or G20 of the group selector circuit 36 in FIG. 6.

If the low order ZERO in the information from gating bus 10 appears in bit position 5 its ground state disables gate 83 thereby causing that gate to provide a positive enabling signal to the gate 89. The gate 89 is also partially enabled by the positive control signal from gate 67 in FIG. 5 as previously mentioned. Since all of the information bit positions 0 through 3 contain binary ONES, gate 82 is enabled and produces a ground output which disables the gate 88. The positive output from the latter gate completes the enabling inputs to gate 89 so that a ground output signal G4 is produced thereby to disable gates 90, 91, and a further gate 92. The G4 output from group selector 36 is also coupled through cabling to disable the control gate 77 which produces the 2R4 control signal for enabling rotate gates in the second row of the second stage 52 in rotate circuit 27. These conditions indicate that the low order ZERO is contained in the second 4-bit group of bits in the processor word, and the 2R4 signal accordingly causes the processor word to be rotated to the right by four bit positions. This action places the 4-bit group with the low order ZERO in the lowest order group position in the outputs of stage 52 of rotate circuit 27. Since those outputs are also coupled to the first ZERO detector 32 in FIG. 7, as previously described, it then falls to the latter circuit to determine in which of the 4 bit positions the low order ZERO lies.

A similar type of operation takes place if the low order ZERO is in any one of the other 4 bit groups of the processor word to control stage 52 for rotating that bit group into the low order group position. If it should happen that there is no ZERO in the processor word at all, gate 92 in group selector 36 is fully enabled and produces a ground signal G20 which is applied to the control gate 77 in FIG. 5 which produces the positive 2R0 control signal. The latter signal enables the gates in the first row of the stage 52 in FIG. 3B so that the processor word is passed through the rotate circuit 27 with no rotation at all.

It will be observed that the arrangement just described for controlling the amount of rotation in accordance with the information content of a processor word makes it possible for the first ZERO detector 32 in FIG. 7 to have a substantially smaller bit width than does the full processor word. In the illustrative embodiment the first ZERO detector 32 is only 4 bits wide, while the processor word is 16 bits wide. At the same time the group selector circuit 36 which provides the aforementioned control of rotate circuit 27 is also useful for providing masking functions so that different predetermined portions of a processor word can be examined for the low order ZERO therein regardless of the information state of other portions of the word.

In order to utilize the masking capability of group selector circuit 36, control signals FG0 through FG2 are provided from the rotate control circuit 29 in FIG. 5 as previously described. When masking is to be performed one of the three last-mentioned control signals is placed in a ground state while the other two are in a positive voltage state in accordance with the binary states of the two higher order control signals RF4 and RF8 which are applied to rotate control circuit 29. If the FG0 signal is at ground, the group selector circuit 36 is forced to ignore the three high order bit groups and operate as though a low order ZERO were contained in the lowest order 4-bit group of the processor word for a low order ZERO. The ground output from gate 88 disables all of the gates 89 through 92. Accordingly, the output signal G0 is at ground and causes control gates 77 to produce the 2RO control signal to permit transmission of the processor word through rotate circuit 27 without rotation. Thus, the low order bit group is examined in a first ZERO detector 32.

If the masking signal FG1 had been the one in the ground condition, it would disable gates 90 and 91 in group selector circuit 36 so that the latter circuit could observe only the two lower order bit groups for a ZERO. For this purpose the portion of group selector 36 associated with these 2 bit groups operates in the manner hereinbefore outlined to cause one of the signals G0, G4, or G20 to control the rotate circuit stage 52. Similarly, if the masked signal FG2 is in the ground state, it disables gate 91 in group selector circuit 36 so that such circuit can examine only the three lower order bit groups for a ZERO information signal.

The outputs of gates 88 through 92 in group selector circuit 36 of FIG. 6 are combined in four further gates 96, 97, 98 and 99 to produce control signals for use in the expand logic 33 of FIG. 8 in a manner which will be subsequently described.

FIG. 7 includes details of the first ZERO detector 32 and translator 41. First ZERO detector 32 receives output signals in cable 31 from the low order 4 bit positions in the output of rotate circuit 27. In the cable 31 binary ONE and ZERO information bits have the same voltage status that they had on gating bus 10. Thus, a binary ZERO is represented by a ground and a binary ONE by a positive signal. The four bit signals from cable 31 are coupled by inverting gates 100, 101, 102, and 103 to inputs of four additional gates 106, 107, 108, 109, respectively. If any bit signal in cable 31 is in the ZERO information state, it is converted from its ground voltage state by its corresponding inverting gate to a positive enabling signal for its corresponding one of the gates 106 through 109. It is also directly coupled through cable 31 to an input of each higher order one of the gates 106 through 109 to disable such gates. Consequently the four output signals S0, S1, S2, and S3 from first ZERO detector 32 produce a one-out-of-S indication including a single ground signal in the one of the 4 bit positions which contains a low order ZERO. If none of those 4 bit positions contains a ZERO, all of the outputs S0 through S3 are positive. The latter outputs are directly coupled to inputs of a gate 110, the latter gate is able to produce a ground output signal ZCFNZ to indicate to central control 19 that no binary ZEROS have been detected.

If it is desired to examine less than all of the 4 bit positions represented by circuits in cable 31, an appropriate one of the bit masking control signals FB0, FB1, and FB2 is placed in the ground state by the masking gates 80 in FIG. 5. This masking operation takes place in much the same fashion previously described in connection with the group masking signals also originating from the gates 80. Thus, if the masking signal FB0 is at ground, it disables all of the gates 107, 108 and 109 so that only the lowest order bit position signal, which is coupled through gate 106, can possibly indicate a ZERO. In like manner the lowest order 2 bit positions are examined when the masking signal FB1 is at ground and disables gates 108 and 109. The lowest order 3 bit positions are examined when masking signal FB2 is at ground and disables gate 109.

In the illustrative embodiment herein presented first ZERO detector 32 is used during either the find-low-ZERO-test or during the ADDS operation. Accordingly, the output of gate 93 in FIG. 5 is applied to an input of a gate 94 in FIG. 7 in conjunction with a clock signal from central control 19 to produce a ground output signal for disabling a gate 95. The latter gate produces a positive output control signal FLZ which enables the gate 110 of the first ZERO detector 32 and the translator 41.

It is usually desirable in data processing systems to have available a binary coded representation of the bit position address within a processor word where the low order ZERO is found. Translator 41 performs this function and provides the complement of a 4-digit binary coded indication of that address. If all four translator output signals SAAO through SAA3 are in the ground ZERO state, it is known that a ZERO is contained in the processor word bit position 15. If all four outputs are in the ONE state the low order ZERO is in the bit position 0, and the same is true if no ZERO is found. In the latter case the processor detects the fact by comparing the state of the ZCFNZ signal and the translator 41 outputs.

Outputs from the three higher order bit positions of the four outputs of detector 32 are combined in two gates 111 and 112 to produce the two lower order digits of the binary coded bit address generated by translator 41. The outputs of gates 111 and 112 are inverted by gates 113 and 116 to place the address in the proper bit voltage sense for use by central control 19. Similarly, the three higher order group output signals G4, G8, and G12 are coupled through group selector circuit 36 and cable 39 to inputs of gates 117 and 118 for producing the two digits of higher significance in the address generated by translator 41. Outputs of gates 117 and 118 are inverted by gates 119 and 120.

FIG. 8 illustrates details of the expand logic 33 and other circuits utilized to apply the output of first ZERO detector 32 to the inputs of the various bistable circuits in the SRC register 16. It was previously noted that in cases where the detector 32 is not employed the output of rotate circuit 27 is applied through control gates 66 to the setting inputs of the various bistable circuits in SRC register 16. In that situation the ground ZEROS and positive ONES in the output of the second stage 52 are inverted by the gates 66 so that the binary ONES are grounds and can set appropriate stages of the register 16.

In operations which require that a low order binary ZERO be located in a processor word, the first ZERO detector 32 is employed. Examples of that type of operation are the find-low-ZERO-test and various types of adding operations. It is necessary for these operations to mark the processor word bit position containing the detected low order ZERO . However, since the first ZERO detector 32 has a bit width which is much narrower than the width of a processor word, the indications of a detected low order ZERO may not be, in the output of detector 32, correctly related to the corresponding bit position of the processor word.

Accordingly, expand logic 33 is provided for operation under the control of the G–N output signals of group selector circuit 36 in FIG. 6. Such control signals steer the four outputs S0 through S3 of the first ZERO detector to the proper bit-group position of the 16 input bit positions of SRC register 16 in the presence of the FLZA control signal. The latter control signal is supplied in response to the output of gate 67 in FIG. 5 and via clocked gate 124 and an inverting gate 125. All other bit-group positions are disabled so that they exercise no control over the contents of the register 16. In this fashion it is possible to mark the correct bit position in the register without the necessity for performing mask generation, masking, and instructing logic operation to mark that bit position as is necessary in some processing systems.

In expand logic 33 gates 121 perform the bit steering function for the bit-group 0 position under the control of the GON signal. A similar set of gates 122 perform the same function for the bit-group 3 under the control of the G12N signal. Two additional sets of gates, which are merely schematically indicated in FIG. 8 perform a similar function for bit groups 1 and 2 under the control of signals 64N and 68N respectively.

The G–N signals are normally in the ground state, and one of them is raised to the positive voltage state as directed by the group selector circuit 36 to exercise the described steering control by enabling its corresponding set of gates in the expand logic 33 when they are enabled by the clocked FLZA signal. Four gates 123 invert the S0 through S3 outputs of the detector 32 prior to the performance of the steering function. If the GON signal is positive, the inverted signals from the gates 121 affect the group 0 bit positions in register 16. Only one of those four signals so coupled will be in the ground state, and it operates to set the corresponding bistable circuit in the SRC register 16.

Each of the connections from an output of expand logic 33 to a set input of register 16 is also provided with a cross-connection through the appropriate gates to the reset input connections of any register stages of lower orders of binary significance. Thus, in FIG. 8 the output of gate 121 in the bit position o includes no cross connections because three are no stages of lower order in the register. The similar output from the gate 121 in the bit position 1 is directly connected to the set input of its corresponding bistable circuit and is coupled to the reset input of the bistable circuit in bit position 0 through two gates 126 and 127. Similarly, the set input connection in bit position 2 is cross-coupled through gates 126 and 127 to the reset input of bit position 0 and through two gates 129 and 130 to the reset input of the bistable circuit in bit position 1. Two further gates 131 and 132 provide similar cross-coupling to the reset input of the bistable circuit in bit position 3 from all set input connections of higher order bit positions. Similar connections are provided in all other stages of the SRC register 16 but are not illustrated in detail in FIG. 8. The arrangement just described is utilized in binary counting operations wherein each increment of addition causes the low order ZERO to be set to ONE and the ONES in all lower order bit positions being reset to ZERO. A counting operation of this type is described in detail in my copending application Ser. No. 674,834, filed Oct. 12, 1967, and entitled "Parallel Counter".

It will be observed in FIG. 8 that the gates 127, 130, and 132 in bit positions 0 through 2 are supplied with additional control input signals designated AD2, AD4, and AD8, respectively. The latter control signals are supplied from central control 19 in conjunction with the application of the same signals to gates 57, 58 and 59 of ADD control circuit 28 at the input of rotate circuit 27 in FIG. 3A. At any one time only one of these three control signals is in the ground state while the others are positive. The ground forces the register stages to which it is applied to disregard any reset signals applied thereto by way of the previously described cross-coupling connections. Accordingly, during any counting operation the contents of register 16 are modified in a manner to represent counting by increments of 1, 2, 4, or 8, depending upon whether none or any particular one of the control signals is in the ground state.

If all three control signals are positive, the normal cooperation of detector 32, expand logic 33, and register 16 is to increment the contents of the register by unity each time that a counting operation is conducted during the ADDS control signal. However, if during such time the AD2 signal is at ground, the bit position 0 in rotate circuit 27 disregards the information signal state; and the bit 0 circuit of register 16 disregards cross-coupled reset signals. Accordingly, the contents of register 16 are altered in increments of two each time an ADDS control is applied. In similar fashion if the control signal AD4 is at ground bistable circuits in bit positions 0 and 1 in register 16 cannot be reset and the circuit counts in increments of four. Likewise, if the control signals AD8 is in the ground state, the contents of register 16 are altered in increments of eight.

Figure 10:
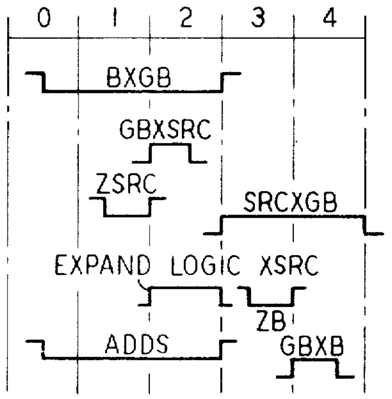
Figure 11:
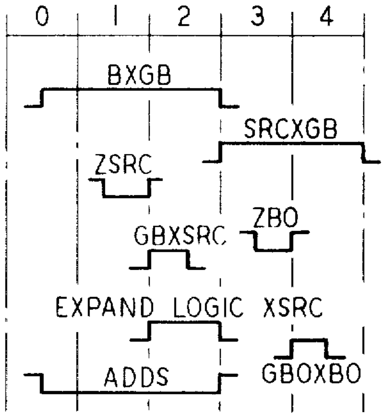

FIGS. 9 through 11 include timing diagrams illustrating three specific types of operation that can be performed by the data processing system described herein, and all of which utilize to advantage a first ZERO detector in combination with a plurality of processor registers. All of the diagrams are drawn to a similar time scale. Mnemonic reference characters adjacent to different parts of the diagrams indicate the corresponding control signal voltage states, i.e., either positive or ground as previously noted in the descriptions of the various circuits.

In FIG. 9 the FLZT signal, for a find-low-ZERO-test, is brought to ground and held at that level throughout the operation. The GRXGB signal goes positive in the time interval 0 to couple the output of GR register 11 to the gating bus. In the interval 1 the ZSRC signal goes to ground briefly to reset the SRC register 16, and the ZAA signal ZEROes AA register 12. In the time interval 2 the expand gates are activated to couple information signals to the SRC register 16 by operation of the G–N signals which are applied from the group selector circuit 36 to the expand logic 33. During this same time interval the outputs of detector 32 are utilized in other fashions besides the activation of the expand logic. The ZCFNZ signal is coupled to the processor. In addition, the detector outputs are utilized by binary translator 41 to produce the bit position address of the located ZERO, and an FLZ signal transfers that address to the AA register 12 for subsequent utilization by the processing system. During time intervals 3 and 4, after the end of the GRXGB signal, the SRCXGB signal places the contents of the SRC register on gating bus 10; and thereafter the GBXGR signal applies those contents to the GR register 11. Such contents include in the register 16 a binary ONE signal in the indicated bit position and ZEROS in all other bit positions. The binary ONE signal sets the low order O in the GR register to the ONE state, but the ZERO indications in the other bit positions of the information thus applied to register 11 do not affect the information stored therein.

FIG. 10 depicts the counting, or ADD operation. In the example illustrated the contents of the B register 13 are incremented by unity. Initially, the BXGB signal goes positive and couples the register contents on to the gating bus 10. That signal persists to the end of time interval 2. During the BXGB signal central control also applies the ADDS ground signal to the rotate control 29 in FIG. 5. At the beginning of time interval 2 the GBXSRC signal applies the contents of the B register from the gating bus 10 to the SRC register 16. During the end portion of time interval 1 the ZSRC signal ZEROes the SRC register so that the new information from the B register is clearly established therein during time interval 2 in response to GBXSRC. During time interval 2 the expand gates are coupled to the SRC register in the same fashion previously noted in connection with FIG. 9. As previously described herein, and also indicated in my aforementioned application, the confluence of information signals from the detector 32 and the gating bus 10 in the register 16 causes the information in that register to be incremented with respect to its original format in the B register 13. During time interval 3 the B register is ZEROed and the SRCXGB signal couples the output of SRC register 16 to gating bus 10. In interval 4 the GBXB signal couples the incremented information from gating bus 10 into the B register.

FIG. 11 depicts timing diagrams for an operation in which the lowest order bit in the B register is complemented without altering the condition of any other bits in that register. This operation is a variation of the ADDS operation just described, and it is initiated by the ADDS ground signal during time intervals 0 through 2. During that same time the contents of the B register are applied to the gating bus and from that bus to the previously ZEROed SRC register 16, in much the same fashion previously indicated in connection with FIG. 10. In time interval 3, however, and while the incremented contents of the SRC register 16 are being coupled to the gating bus, a ZBO signal is applied through an input gating circuit 17' in FIG. 1 to reset only the bit 0 stage of the B register 13. Thereafter during time interval 4 a GBOXBO signal couples the bit position 0 from gating bus 10 through the input gating circuit 17' to the setting input of the bit position 0 stage of B register 13. Thus, only bit position 0 of the B register has been affected; and, because of the logic inherent in adding unity to a binary coded number, the information in that bit position was necessarily complemented.

Although the present invention has been disclosed in connection with a particular embodiment thereof, it is to be understood that additional embodiments and modifications which will be obvious to those skilled in the art are included within the spirit and scope of the invention.

I claim:

1. In combination:
at least one general purpose register;
a buffer register;
means controllably coupling the information contents of any one general purpose register to the buffer register; and
logic means interposed in said coupling means between an output of said one general purpose register and an input of said buffer register for altering the information significance of said contents as it is coupled to such buffer register, said logic means comprising means for converting said contents to a one-out-of-$m$-bit indication of the bit position of a low order information bit of a predetermined type in such contents, where $m$ is the number of information bits of said contents.

2. The combination in accordance with claim 1 which comprises in addition: means coupling outputs of said buffer register to inputs of said one general purpose register to overwrite information therein in said low order bit position.

3. In combination:
at least one general purpose register;
a buffer register;
means controllably coupling the information contents of any one general purpose register to the buffer register;
logic means interposed in said controllable coupling means between an output of said one general purpose register and an input of said buffer register for altering the information significance of said contents as it is coupled to such buffer register; and
means further coupling said output of said one general purpose register to inputs of said buffer register directly and at the same time that such output is coupled to said buffer register through said logic means.

4. The combination in accordance with claim 3, in which:
said logic means is a first-ZERO-detector;
said further coupling means operate to increment said contents; and
said logic means include means selectively masking different predetermined portions of said contents for correspondingly altering the magnitude of said incrementing.

5. The combination in accordance with claim 3 which comprises in addition: means transferring a predetermined part of said altered information contents to a corresponding information part of said one general purpose register.

6. The combination in accordance with claim 3 which comprises in addition: means transferring said altered information contents to one of said general purpose registers.

7. The combination in accordance with claim 6 which comprises in addition: means selectably actuating said direct coupling means simultaneously with said logic means to increment said data in a counting mode or to disable said direct coupling means during the operation of said logic means to alter said data at only said low order bit for finding and marking such bit.

8. In combination:
at least one general purpose register;
a buffer register;
means controllably coupling the information contents of any one general purpose register to the buffer register;
logic means interposed in said coupling means between an output of said one general purpose register and an input of said buffer register for altering the information significance of said information contents as it is coupled to such buffer register;
a controllable data rotate circuit connected between said general purpose registers and said logic means, said rotate circuit operating in bit-parallel fashion;
said logic means having a substantially smaller bit width than said rotate circuit; and
means controlling said rotate circuit to shift the position of a predetermined group of data bits in the contents of said one general purpose register to an input of said logic means.

9. The combination in accordance with claim 8 which comprises in addition:
a steering circuit coupling the output of said logic means to inputs of said buffer register; and
means controlling said steering circuit to couple said predetermined group of data bits to a predetermined position in said buffer register.

10. The combination in accordance with claim 8 in which:
said rotate circuit includes at least two stages each comprising a plurality of rotation circuit modules; and
each of said modules accomplishes rotation in a particular bit position and selectably rotates its signal bit through any one of $r$ different amounts of rotation whereby the total rotation effected by said rotate circuit is the sum of rotation effected in said two stages.

11. The combination in accordance with claim 10 in which:
data information bits coupled to inputs of said rotate circuit include $n$ bit groups,
a first one of said two stages includes means rotating said information contents any selectable number of bit positions from zero up to the bit size of any one of said bit groups; and
a second of said two stages is coupled to an output of said first stage and includes means rotating said data information bits a selectable number of bit group positions.

12. The combination in accordance with claim 11 in which:
a group selector circuit is coupled to receive signals from inputs of said rotate circuit to produce a one-out-of-$n$ indication of the input data bit group which contains the lowest order data bit of a predetermined type; and
means applying said one-out-of-$n$ indication to control the rotation selection of said second stage to shift an indicated group of data bits to a predetermined position in outputs of said rotate circuit 13. The combination in accordance with claim 12 in which: said logic means comprises a bit selection circuit coupled to predetermined outputs of said rotate circuit to produce a one-out-of-$s$ indication of the bit position having a low order bit of said predetermined type.